July 17, 1923.

W. A. ARMSTRONG

TRACTOR

Filed Jan. 22, 1921

Inventor
W. A. Armstrong,

By
Geo. F. Kimmel. Attorney

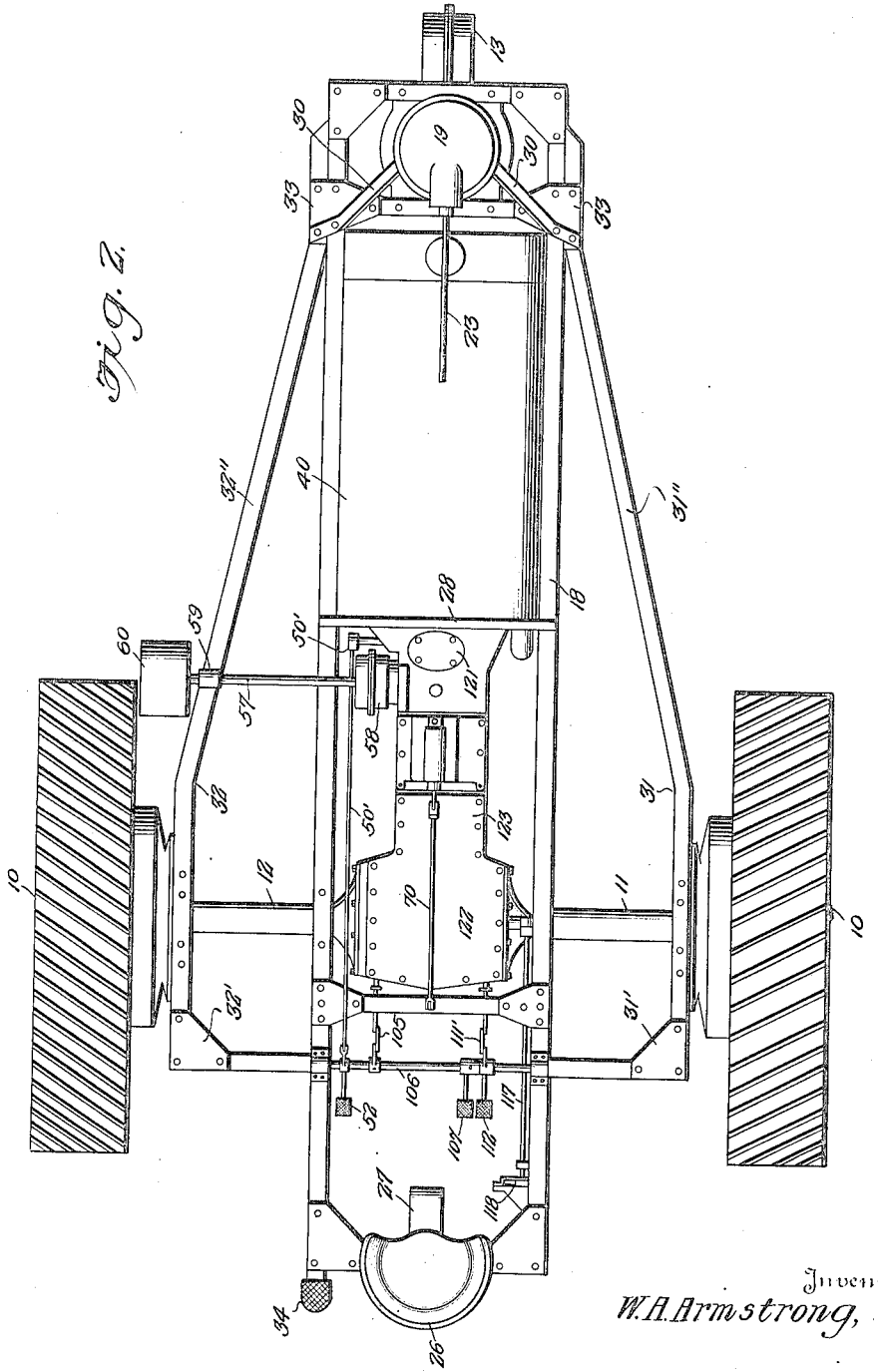

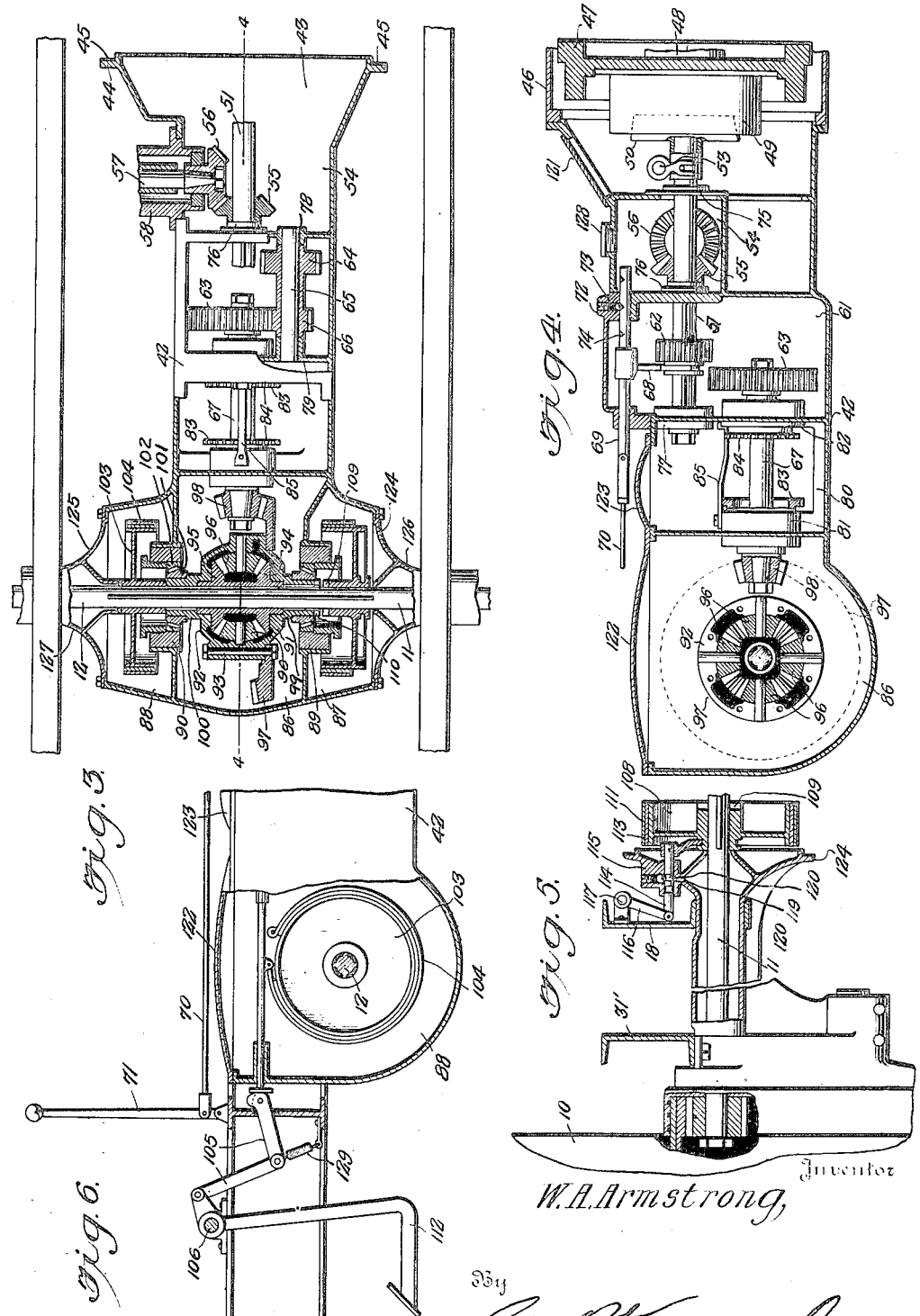

Patented July 17, 1923.

1,461,997

UNITED STATES PATENT OFFICE.

WILLIAM A. ARMSTRONG, OF WACO, TEXAS, ASSIGNOR TO ARMSTRONG FARM TRACTOR COMPANY, OF DALLAS, TEXAS.

TRACTOR.

Application filed January 22, 1921. Serial No. 439,215.

*To all whom it may concern:*

Be it known that I, WILLIAM A. ARMSTRONG, a citizen of the United States, residing at Waco, in the county of McLennan and State of Texas, have invented certain new and useful Improvements in a Tractor, of which the following is a specification.

This invention relates to improvements in tractors, more particularly to a housing of unitary construction for the transmission and differential mechanisms, and the invention has for its object to provide a housing in a manner as hereinafter set forth to assure full and complete protection for the transmission, differential and other enclosed elements of the machine, and at the same time admit of ready access to the interior of the housing for repair, removal, or replacement of such parts as required without disturbing or exposing the parts which are not to be repaired, removed or replaced.

With the foregoing and other objects in view, the invention resides in the certain novel and useful arrangement and construction of parts as will be hereinafter more fully described, set forth in the appended claims, and illustrated in the accompanying drawings, in which:

Fig. 2 is a top plan view thereof.

Fig. 3 is a horizontal sectional view of the power transmission and differential mechanisms enclosed within the housing, Fig. 4 is a vertical longitudinal sectional view taken on the line 4—4 of Fig. 3.

Fig. 5 is a fragmentary view, in section, of a half portion of the driven tractor axle showing a central means for operating one of the brake band drums to and from operative position, and, Fig. 6 is a fragmentary detail showing the pedal means for operating the brake band and clutch actuating rods.

Figure 1:
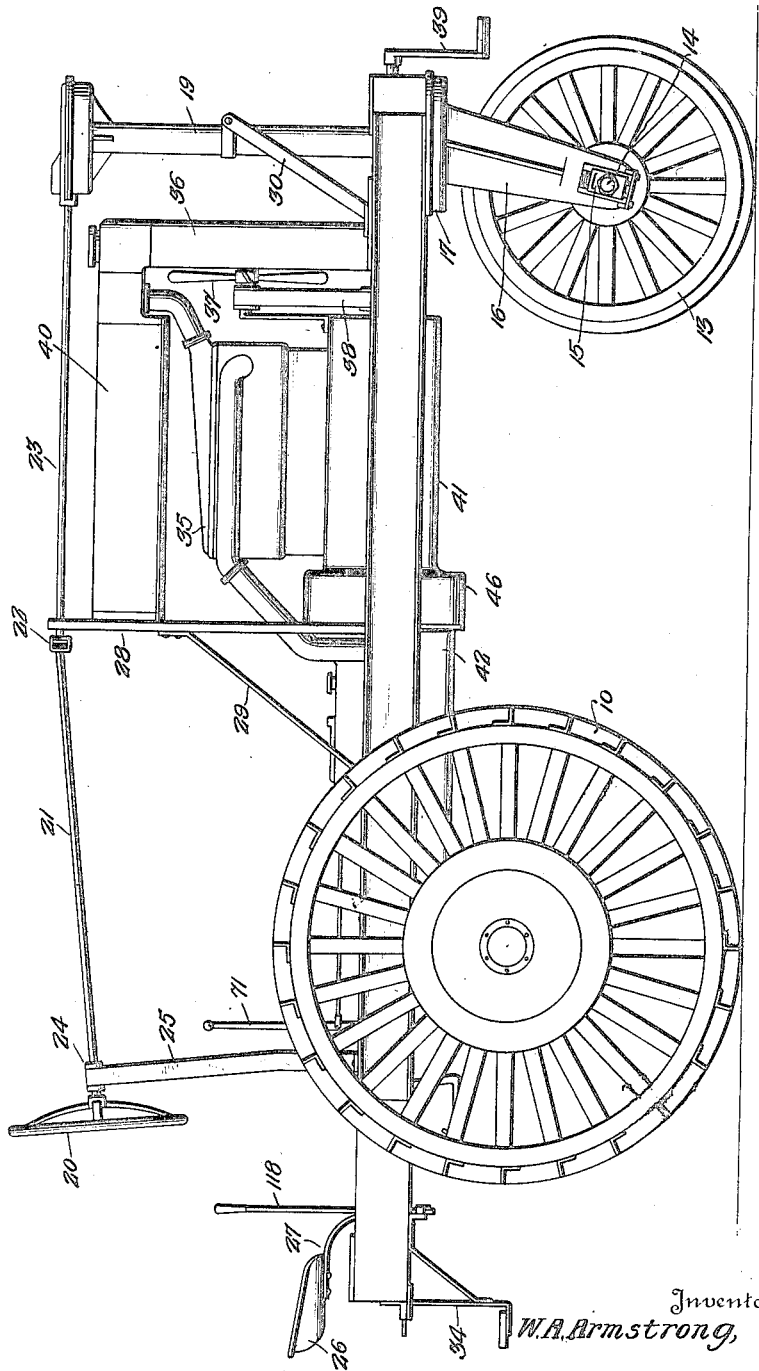
Figure 1 is a side elevation of a conventional form of tractor embodying a housing in accordance with this invention.

Referring to the drawings, a conventional form of tractor is shown and which includes a pair of driven tractor wheels 10 secured on the axle sections 11 and 12. A front steering wheel 13 is provided which is mounted on an axle 14 suitably journaled as at 15, in the space between the depending arm 16 of a steering yoke 17. A substantially rectangular main frame 18 extends forwardly from a point at the rear of and medially between the tractor wheels 10 to a point in advance of these latter and is pivotally supported on the turn table or upper connected portion of the steering yoke 17. The steering yoke 17 is operated through the medium of a steering means, not shown, extended upwardly of the steering post 19, and actuated from the hand wheel 20, through the medium of a forwardly extended connecting rod formed of two sections 21 and 23, swivelly connected together as at 22. The hand wheel 20 is secured on the free end of the section 21 and immediately forward with respect to the hub of the hand wheel, the section 21 is journaled as at 24, in a bracket arm 25 extended vertically from the frame 18, and in a manner to support the hand wheel in proper and convenient position in front of the operator's seat 26.

A spring arm 27 is carried by the frame 18, and is arranged to hold the seat 26 spaced above the rear end of the frame.

The section 23 of the connecting rod is journaled in the upper end of a vertically disposed dash board 28. The steering post 19 and dash board 28 are braced to the main frame by means of braces 30 and 29.

Arranged at opposite sides of the main frame 18 are side frames 31 and 32. The side frame 31 consists of a right angular rear portion 31', and a forwardly extending diagonal portion 31'' and the forward end of the latter is secured to one side of the frame inwardly of the forward end thereof, as at 33. The side frame 32 consists of a substantially rectangular rear portion 32' and a forwardly extending diagonal portion 32'' and the forward end of the portion 32'' is secured at the other side of the main frame, inwardly of the forward end, as at 33.

At the rear of the main frame 18, and at one side of the seat 26, is arranged a suitable step 34 whereby the operator may readily mount the frame for the operation of the tractor.

The power plant of the tractor and its accessories consists of an engine 34, a radiator 36, a cooling fan 37 driven by means of a belt 38 from the engine shaft, and a starting hand lever or crank 39. The elements of the power plant are arranged in any suitable manner at the forward end of the main frame 18. A hood 40 is provided for the protection of the engine and the same extends between and is supported from the dash board 28 and the radiator 26.

Extending longitudinally between the side bars of the main frame 18 and in end to end relation with respect to the fly-wheel housing 46, is a housing 42 for the transmission and differential mechanisms. The housing 42 is of unitary construction and is formed with a flared open end portion 43, provided with an outwardly projecting annular flange 44, forming a shoulder 45 closely abutting against the open end of the fly-wheel housing 46, of the crank casing 41.

The fly-wheel within the housing 46 is indicated at 47, and the end of the engine shaft supporting the fly-wheel 47, is indicated at 48.

Arranged on the free end of the engine shaft 48 and concentrically within the outer face of the fly-wheel 47, is a friction clutch element 49, complemental to a fixed friction clutch element 50 carried on the adjacent end of a transmission shaft 51, and movable thereon into and out of engagement with the element 50, through the medium of a suitable actuating rod mechanism 50' leading to and operable from a foot pedal 52, which is arranged in suitable proximity to the operator's seat 26, the connection of the actuating mechanism with the clutch element 50 being designated at 53.

The reduced intermediate portion of the housing 52 is formed to provide a compartment 54, immediately adjacent the flared end 43, and through this compartment extends the transmission shaft 51 and which is provided with a bevelled gear 55, in mesh with a similar gear 56, carried on the inner end of a transmission shaft 57, disposed transversely and extended outwardly from one side of the housing through a journal 58. The free end of the shaft 57, is journaled, as at 59, to the diagonally extending portion 32'' of the side frame 32. The outer end of the shaft 57 is provided with a pulley 60, for power transmission purposes.

Immediately inwardly of the compartment 54, the housing 42, is formed with a second compartment 61, having mounted therein the forward and reverse mechanisms of the transmission and which consists of a sliding gear 62, mounted on the shaft 51. The gear 62 is adapted to be moved in meshing relation with the gear 63, fixed on one end of a driven shaft 67, for the forward drive of the tractor. The gear 62 is also adapted to mesh with the gear 64, and a counter shaft 65, the latter carries a gear 66 permanently in mesh with the gear 63 on the driven shaft 67. The gear 52 is controlled by means of an arm 68, to which is secured a rod section 69, slidably mounted in the wall at one side of the compartment, and which in turn is connected at one end to an actuating rod 70 leading to and connected with an operating hand lever 71. The wall of the compartment 61 is thickened, as at 72, to provide a seat for a spring tension pawl 73, preferably of ball form and adapted for co-operation with a series of spaced semi-circular recesses 74 in the rod section 69, to retain the sliding gear 62 and its operating means against acidental displacement from adjusted position. The driven shaft 51 is suitably journaled in the walls of the compartments 54 and 61, as at 75, 76 and 77, respectively, while the counter shaft 65 is suitably journaled in the opposed walls of the compartments 61, as at 78 and 79. Inwardly of the compartment 61, the housing 42 is formed with a third compartment 80, through which the shaft 67 extends, and the latter is journaled in bearings 81 and 82, mounted in the walls of the compartments 80 and the said bearings are preferably of the usual adjustable roller bearing type involving the use of a wedging cone, indicated at 83. The peripheries of the flanges of the cones 83 are toothed as at 84, for the cooperation with a leaf spring 85, so that the cones may be held against accidental movement after being adjusted.

The rear end of the housing 42, is formed to provide an intermediate compartment 86 and a pair of oppositely disposed end compartments 87 and 88 and extending concentrically of the end compartments and meeting in end to end relation medially of the intermediate compartment 86 are the axle sections 11 and 12. The adjacent ends of the axle sections 11 and 12 are connected together through the medium of the intermeshing gears of the differential mechanism. Each axle section 11 and 12 is journaled intermediate its ends in roller bearings carried in suitable circular journals which are indicated at 89 and 90 and supported in openings in the divisional walls between the compartments.

The differential mechanism comprises a rotatable housing formed of two parts 91 and 92, suitably secured together by bolts 93 and which encloses the differential bevelled gears 94 and 95 secured on the adjacent ends of the axle sections 11 and 12. Bevelled pinions 96 supported within the rotatable housing mesh the gears 94 and 95.

Power is transmitted to the differential mechanism through the medium of a ring gear 97, formed with the part 91 of the rotatable housing, and which meshes with a pinion 98, carried on the end of the driven shaft 67.

Formed integral with and projecting outwardly of the parts 91 and 92, of the rotatable housing, are sleeves 99 and 100, respectively, the outer ends of which are reduced to receive thereon bearing rings 101 against the inclined faces of which contact small cylindrical bearings, which are held in position within the journals 89 and 90 by means of wedge rings 102.

Fixedly secured on the axle section 12, is a brake band drum 103, having a brake band 104 extended around the same, and which is operable through the medium of a suitable connection link or rod 105 leading to and connected to a pedal shaft 106, which shaft is to be actuated only by a brake pedal 107.

On the axle section 11 is slidably mounted a drum 108 having its inner hub end formed to provide a clutch face 109, complemental to a similarly formed clutch face 110, formed on the free end of the sleeve 99. Extended around the drum 108, is a brake band 11, which is actuated through the medium of the rod and link connections 111' of a brake pedal 112 loosely mounted on the pedal shaft 106, immediately adjacent to the brake pedal 107. The brake pedal 107 is fastened to the shaft 106 for the actuation thereof to operate the brake band 104. It is to be noted that the pedal 52 is also loosely mounted on the shaft 106, so as not to affect the latter, during its movements with the operation of the clutch 50.

For moving the clutch face 109 on the drum 108, into and out of engagement with the clutch face 110 of the sleeve 99, an arm 113 is fixed to the outer hub portion of the drum 108 and the same is engaged by a short rod section 114, slidably mounted in the bracket 115.

The arm 113 is connected at its outer end by means of a link 116, to an operating rod 117, the latter extending rearwardly of the main frame 18 to a point adjacent to operator's seat 26, and is provided at this point with a hand lever 118. The bracket 115 is formed with a vertically extending opening in which is seated a spring pressed pawl 119, preferably of globular form, as shown in Fig. 5, and which is adapted to engage in suitably spaced annular channels or recesses 120, formed in the short rod section 114, whereby to hold the drum clutch 109 in either engaged or disengaged position.

As before stated the housing 42, in general, is of a single unit construction, and to give access to certain of the several mechanism compartments thereof, suitable closure plates or covers are provided and in this connection for the compartments 43, a cover 121 is employed, for the compartment 86 a cover 122 is employed and which is also used for closing the compartment 80, as the cover 122 has an extension 123. Circular closures 124 and 125 are provided for the compartments 87 and 88. The closures 124 and 125 are integral with the housing 126 and 127.

The compartments 54, 61, 80 and 86 are thus fully enclosed with the cover plates 121, 122 and the extension 123, and these compartments may be filled with oil, a suitable opening normally closed by a screw cap 128 being provided for supplying oil to the compartment 54.

The compact arrangement of the transmission and differential mechanisms within a unitary housing provides for the protection of the same against unusual accidents and against injury from exposure to weather conditions; that the integral or unitary construction of the housing admits the operation of all of the gears of the transmission and differential mechanisms in a body of oil without any loss of the latter from leakage such as occurs when a gear housing is made up of several sections; that the arrangement of the removable cover plates or covers permit quick assembling of the parts of a mechanism within the housing, rapid inspection of a particular mechanism and the removal and repair of the same without necessarily disturbing and removing the mechanisms in their entirety, and also that the power transmission and differential mechanisms may be assembled in the housing before the same is placed in position on the frame or chassis of the tractor or vehicle.

Having thus fully described the invention, what is claimed, is:—

1. In a tractor, a motor, a housing comprising an integral body portion arranged below and projecting rearwardly from the motor and formed with integral transverse and longitudinal partitions providing a series of opposed transverse compartments and a longitudinal compartment at each side of the rear transverse compartment, a driven shaft operated from said motor and journaled in the plurality of transverse partitions and extending through a series of transverse compartments, a clutching device within one of said transverse compartments and cooperating with said shaft for coupling it with the motor, transmission and reverse drive mechanisms mounted in said transverse compartments forwardly of the rear transverse compartment, a differential mechanism mounted in the rear transverse mechanism, a brake device arranged in each longitudinal compartment, axle sections extending through said devices and operatively connected to said differential mechanism, and removable cover elements for said body portion.

2. In a tractor, a motor, a housing comprising an integral body portion arranged below and projecting rearwardly from the motor and formed with integral transverse and longitudinal partitions providing a series of opposed transverse compartments and a longitudinal compartment at each side of the rear transverse compartment, a driven shaft operated from said motor and journaled in the plurality of transverse partitions and extending through a series of transverse compartments, a clutching device within one of said transverse compartments and cooperating with said shaft for coupling it with the motor, transmission and reverse drive mechanisms mounted in said transverse compartments forwardly of the rear transverse compartment, a differential mechanism mounted in the rear transverse mechanism, a brake device arranged in each longitudinal compartment, axle sections extending through said devices and operatively connected to said differential mechanisms, and removable cover elements for said body portion, independent shifting means for said brake devices and coupling device, said shifting means operated from the rear end of the housing.

In testimony whereof, I affix my signature hereto.

WILLIAM A. ARMSTRONG.